United States Patent [19]
Despres

[11] Patent Number: 5,600,309
[45] Date of Patent: Feb. 4, 1997

[54] OPERATIONALLY SECURE COMMUNICATION ASSEMBLY

[75] Inventor: Remi Despres, Montesson, France

[73] Assignee: Reseaux de Communications d'Entreprise, Paris, France

[21] Appl. No.: 269,114

[22] Filed: Jun. 30, 1994

Related U.S. Application Data

[63] Continuation-in-part of Ser. No. 984,491, Dec. 2, 1992, abandoned.

[30] Foreign Application Priority Data

Dec. 6, 1991 [FR] France .................................. 91 15171

[51] Int. Cl.$^6$ ........................................... H04Q 9/00
[52] U.S. Cl. ........................ 340/825.02; 340/825.16
[58] Field of Search ..................... 340/825.02, 825.16, 340/825.01; 370/85.13, 94.1, 94.3, 16; 395/182.02

[56] References Cited

U.S. PATENT DOCUMENTS

| | | | |
|---|---|---|---|
| 4,701,756 | 10/1987 | Burr | 340/825.02 |
| 4,733,069 | 9/1988 | Boulton et al. | 395/182.02 |
| 4,811,337 | 3/1989 | Hart | 370/85.13 |
| 5,014,262 | 5/1991 | Harshavdhana | 370/16 |
| 5,023,873 | 6/1991 | Stevenson et al. | 395/182.02 |
| 5,027,342 | 6/1991 | Boulton et al. | 370/16 |
| 5,058,105 | 10/1991 | Mansour et al. | 370/16 |
| 5,084,870 | 1/1992 | Hutchison et al. | 370/94.1 |
| 5,105,420 | 4/1992 | Ardon et al. | 370/16 |
| 5,150,360 | 9/1992 | Perlman et al. | 370/94.3 |

FOREIGN PATENT DOCUMENTS 3829739 3/1989 Germany .

*Primary Examiner*—Edwin C. Holloway, III
*Attorney, Agent, or Firm*—Pollock, Vande Sande & Priddy

[57] ABSTRACT

A communication assembly is disclosed which is constituted by at least two nodes (A, B, C, D), the nodes (A, B, C, D) each being equipped with at least one port (1 to 3 of A, B, C, D), the ports belonging to distinct nodes (A, B, C, D) being connected by links (a, b, c, d, e, f). When the links or nodes are out of working order, one or more operational networks are constituted whose links connect the nodes in working order and do not bring about loops. The ports are divided in fixed ports (1, 2, 3 of A), in variable ports which are do are dominant (2, 3 of B; 2 of D), and in variable ports which are not dominant (1 of B; 1, 2, 3 of C; 1, 3 of D) laid out in a specific manner one with respect to the other.

11 Claims, 5 Drawing Sheets

OPERATIONALLY SECURE COMMUNICATION ASSEMBLY

This application is a continuation-in-part of U.S. patent application Ser. No. 07/984,491 filed Dec. 2, 1992, now abandoned.

FIELD OF THE INVENTION

The present invention concerns a communication assembly consisting of at least two nodes, the nodes each being equipped with at least one port, the ports belonging to distinct nodes united by links, the links constituting a tree configuration.

In such a communication assembly, a failure or a defect of one or several nodes and/or of one or several links can provoke a loss in communications between many nodes which nevertheless remain in working order.

Various propositions have been advanced to attempt to resolve this problem with the aid of supplementary links which are put in service only in case of necessity, but these have not been, to date, totally satisfactory because of the complication and cost generated by such propositions, and equally because they do not allow, in a large number of cases, to guarantee maintaining the functioning of a network comprising a maximal number of nodes remaining in working order.

SUMMARY OF THE INVENTION

Consequently, the present invention aims to provide a communication assembly of the type described in the introduction to which have been added supplementary links in which, when a sub-assembly of nodes and/or links is not in working order, after a finite period of time, one or several operational networks are established, whose links do not form a loop, uniting in many cases a maximal number of nodes remaining in working order in a single operational network. Moreover, the invention must permit, with simple and economical means, the formation of very varied assembly configurations.

To this effect, the communication assembly according to the invention is characterized in that the nodes include fixed ports, never able to assume a root state, as well as variable ports able to assume a root state. The root node of an operational network does not include any variable port in root state whereas the other nodes include one and only one port in root state. Each of these other nodes of the same operational network are connected to the root node by a series of links which in the operational state connect a port in the root state of one node to a port that is not in the root state of another node in the direction of the root node. The variable ports of a same node have a pre-preset rank, two variable ports of different nodes connected together such that one and only one of them comprises an attribute of dominance. A transmission means is arranged so that this one port can send to the other variable port to which it is connected a "request to be in root state" signal, said signal being emitted on every dominant variable port which is the port in the root state for node or which has a lesser rank than the port of its node which is in the root state. A variable port is in the root state if none of the ports of lesser rank in the same node is in the root state, and if it does not receive a "request to be in root state" signal.

According to one embodiment of the invention, a variable port may become root port of its node only if it receives, from the port to which it is connected, an "authorization to be in root state" signal. A fixed or variable port emits an "authorization to be in the root state" signal only if it determines that its connect link is in working order and is not in the root state. One avoids in this manner introducing in the operational network a link not working in some manner. Possibly, in this case, an "authorization to be in root state" signal is transmitted in the same manner as the absence of a "request to be put in the root state" signal on the same link. This embodiment permits utilizing a single signal with two values for each direction between each pair of ports, namely "request to be in the root state" and "authorization to be in the root state".

BRIEF DESCRIPTION OF THE DRAWINGS

The invention will be well understood upon reading the following description by referring to the annexed drawings in which.

DESCRIPTION OF THE PREFERRED EMBODIMENTS

Figure 1:
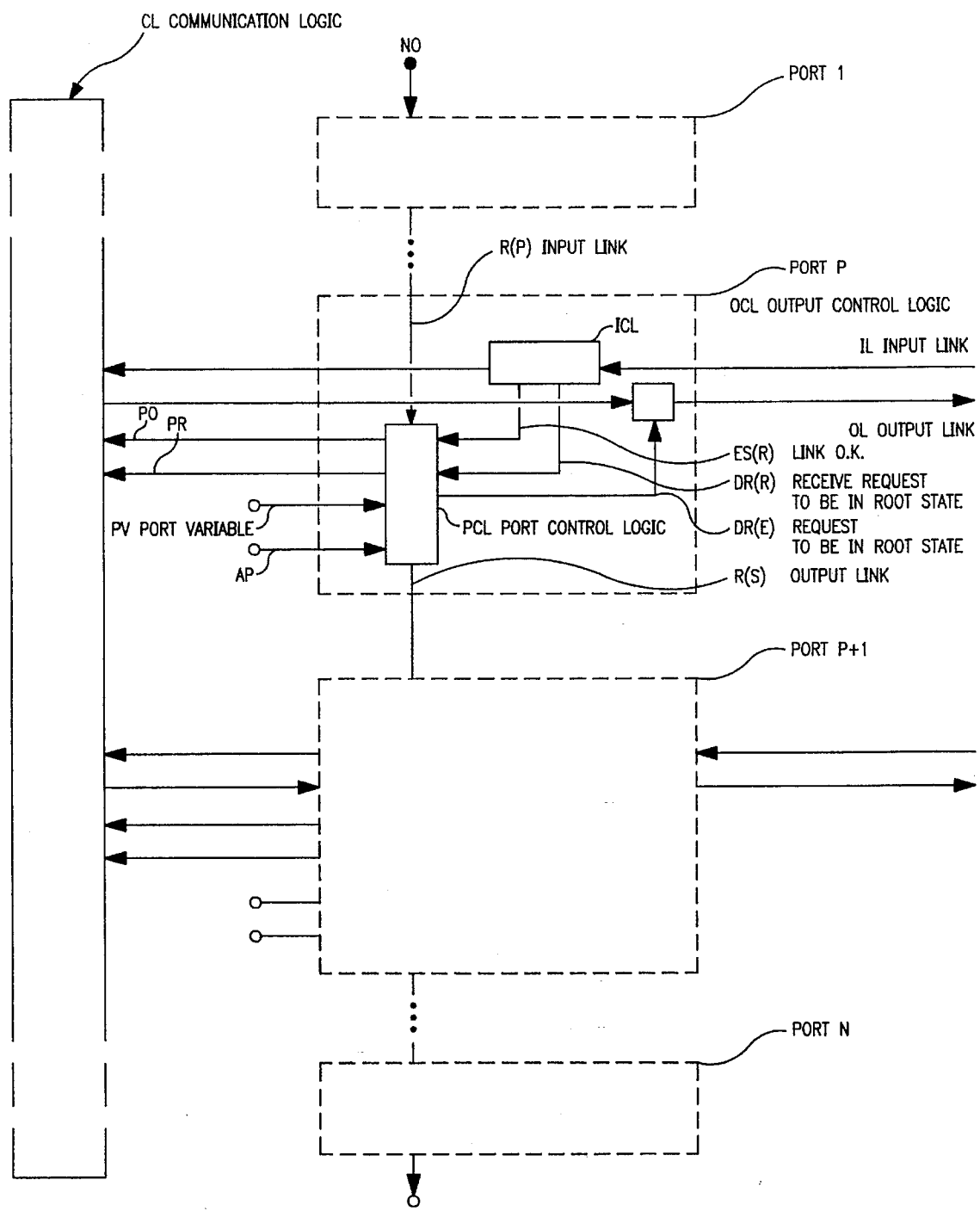
FIG. 1 is a schematic of a node according to the invention.

FIG. 1 represents an embodiment of a node of the communication assembly according to the invention. The port control logic PCL of a port P comprises an input link R (P) with the preceding port in the order of increasing ranks permitting the passage of a signal indicating that there exists a root on the side of the preceding port, R (P) being never asserted in the port control logic of port 1. An output R link (S) permits the transmission of such a signal to the following port. An input AP permits to indicate to the port P the dominance attribute on the link. An output P0 permits the passage of a signal indicating that the port P is operational, whereas an output PR permits the passage of a signal indicating that the port P is in a root state, which is necessary where the application of the operational network necessitates that the links be oriented towards a root node. An output DR (E) is used to emit a request to be in the root state whereas an input DR (R) is furnished to receive a request to be in the root state. A line ES (R) indicates that the input link is in working order. Input link IL and output link OL are sublinks of the same link. There is no signal DR (R) if the link is not in working order. An input line PV indicates that the port is variable. The output control logic OCL, when it receives a DR (E) signal, modifies signals which are transmitted by the communication logic CL on the output sublink OL so that a "request to be in root state" signal can be received by the input control logic ICL of the node port at the other end of the link. Assuming that the communication logic is that of an IEEE 802.3 10 Base.T network, the "request to be in root state signal" can be defined as the fact that polarities on the two wires used for transmission are reversed, which can be detected by the receiver at each start of message or at each of the link test pulses which are transmitted from time to time in the absence of message. The input control logic ICL restores the original polarity of signals which go to the communication logic CL and asserts the DR (R) signal if the last detected polarity was reversed. It affects the ES (R) signal only if received signals on the input sublink IL indicate that the link is in working order, for example, with 10 Base.T, if neither silence nor transmission lasts more than its maximum value. The absence of either test pulses or a data frame on the sublink IL will result in a failure being detected on sublink IL.

According to the invention, the port control logic implements the conditions which follow to determine its output signals. This implementation can for example be done by means of programmable gate arrays. There exists a signal PR identifying the port as being in the root state if and only if there is a signal on PV indicating the port is variable, no signal on R (P)indication that a port of higher rank is in the root state a signal on ES (R) and no signal on DR (R) indicating a request to be in the root state has been received from a connection node.

Similarly, there exists a signal on P0 if and only if a signal is emitted on PR identifying the port is in the root state, or if the signals are received on ES (R) and on DR (R).

A signal is emitted on R (S) if and only if a signal exists on R (P) or on PR indicating a variable node of a port of a higher rank is in the root state.

DR (E) emits a signal requesting to be in the root state if and only if there exists a signal on PV, no signal on R (P), and a signal on AP or no signal on DR (R), or if there is no signal on ES (R) (which corresponds to an absence of authorization to be in root state for a cut link).

Figure 3:
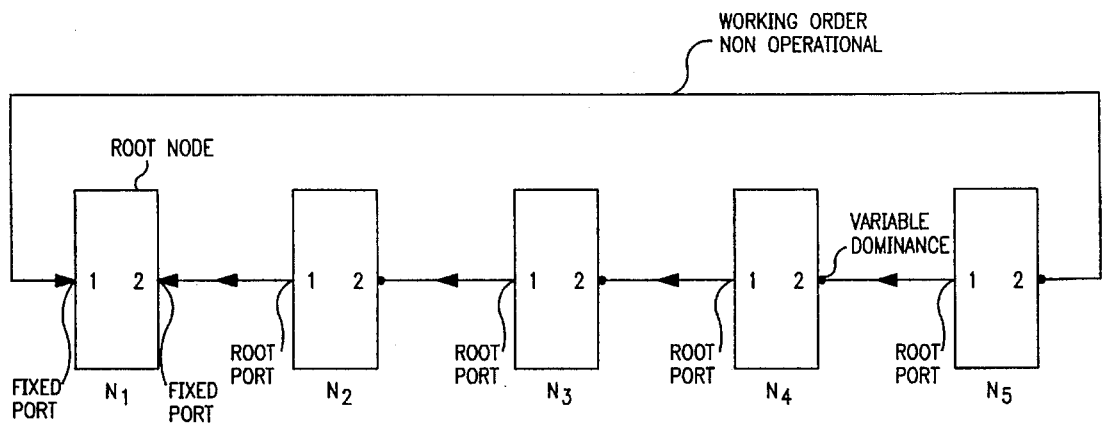
FIG. 3 is a schematic of a communication assembly according to the invention comprising repetitive features.

In the case of the FIG. 3, the communication assembly is formed by repetitive motives each constituted by a node N with two ports, the nodes N being connected in series. The first node N1 is the root node of the normal operational network and its ports are consequently fixed. The root node defines the tree to which other nodes linked work out forming an operational link The other nodes N2, N3, N4, N5 each comprise a port of lesser rank 1 and a port of higher rank 2 which is dominant. The root node N1 is connected to the root port 1 of node N2, which is connected to the root port 1 of node N3, which is connected to the root port 1 of node N4 which is connected to the root port 1 of node N5. Communications to a root node are through a root port of the remaining nodes. This communication assembly is a tree typical one for a configuration which remains connected in case of failure of one link or one node. Although a physical link exists between the root node N1 and node N5, operationally the network is a tree, not a loop. Thus, failure of any single link will not result in a operational failure.

Figure 4:
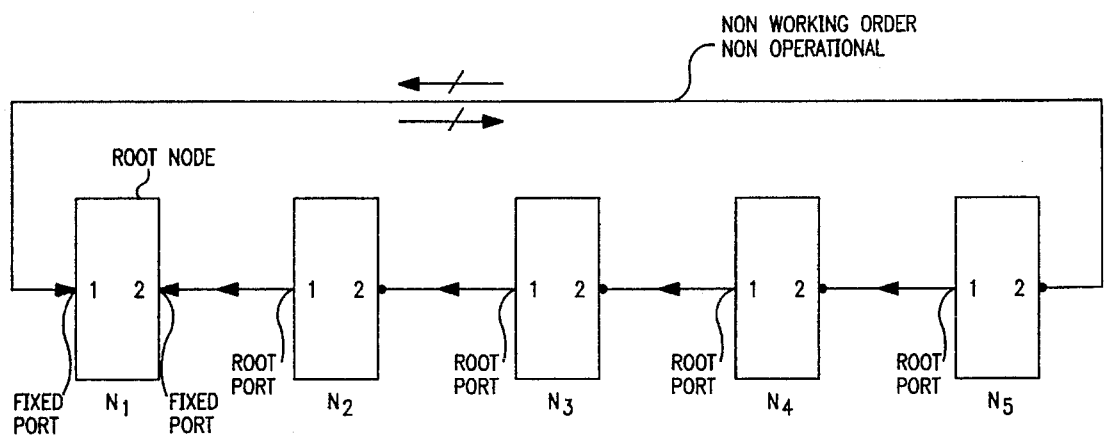
FIGS. 4 and 5 represent the assembly of FIG. 3 with, in each case, a link not in working order.

In the case of an interruption of the link between the nodes N1 and N5 (FIG. 4), the conventions to the root port remain identical.

Figure 5:
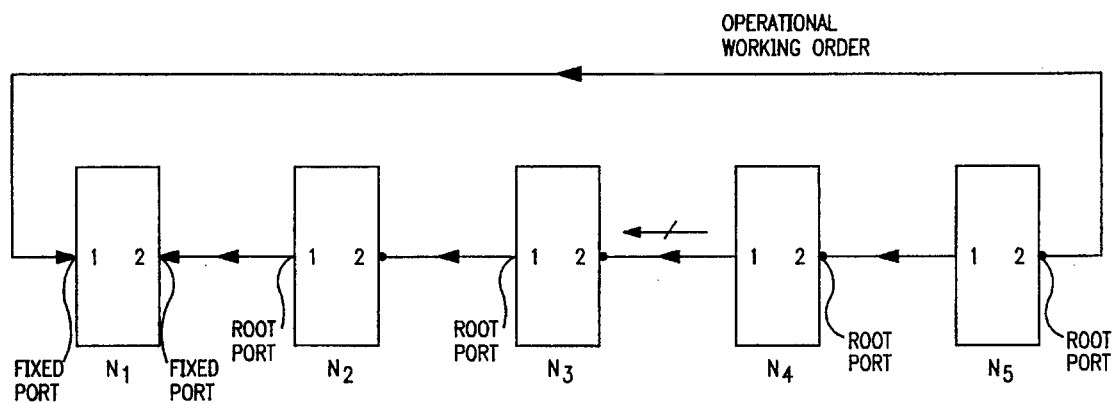

In the case of an interruption of the link between the nodes N3 and N4 (FIG. 5) node N4 sends a "request to be in root state" signal on its port 1. Node N3 which detects that its input link is out of order sends a "request to be in root state" signal on its port 2. Node N4 which does not receive an "authorization to be in root state" signal does not put its port 1 in root state and sends a "request to be in root state" signal on its port 2. An authorization is received from N5 for port 2 of N4 to be in the root state. The node N1 remains connected to the root port 1 of node N2 which remains connected to the root port 1 of node N3. The node N1 is connected as well to the root port 2 of node N5 which gives access to the root port 2 of node N4 which is now in the root state as indicated by the arrow pointed from node N4 to node N5.

Figure 6:
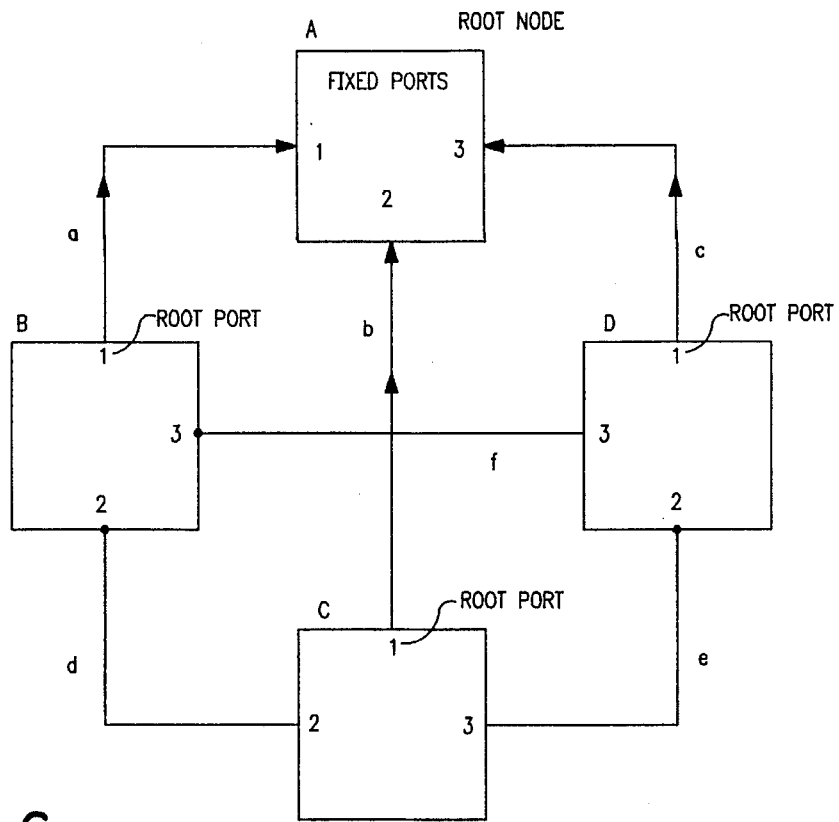
FIG. 6 is a schematic of another communication assembly according to an embodiment consisting of four nodes and four links.

In FIG. 6, the communication assembly comprises four nodes or communication equipments A, B, C, D, the equipment A constituting the root node of the normal operational tree. The node A comprises three ports 1, 2, 3 respectively connected to a port 1 of the node B by a link a, to a port 1 of the node C by a link b, and to a port 1 of the node D by a link c.

The node B comprises a second port 2 connected by a link d to a second port 2 of node C.

The node D comprises a second port 2 connected by a link e to a third port 3 of node C.

A third port 3 of node B is connected to a third port 3 of node D by a connection f.

The ports 1, 2, 3 of node A, which constitute the normal operational root of the assembly, are fixed ports. The ports of nodes B, C and D are variable ports.

This communication assembly is such that it remains in a single operation network in all cases where one or two elements, link or node, are out of order. Extra nodes which would be connected each one to fixed ports of three nodes of this assembly would remain capable of communicating on a single operational network as long as they are themselves in working order and no more than two elements are out of order.

In the case of the normal functioning of the communication assembly of FIG. 6, the ports 1 of nodes B, C, D are ports in root state and the ports 2 and 3 of nodes B, C, D are ports that are not in root state. The root node A is connected to the root port 1 of node B by the link a, of node C by the link b and of node D by link c. Although the links between nodes form a physical loop, operationally the assembly is configured as a tree.

Figure 7:
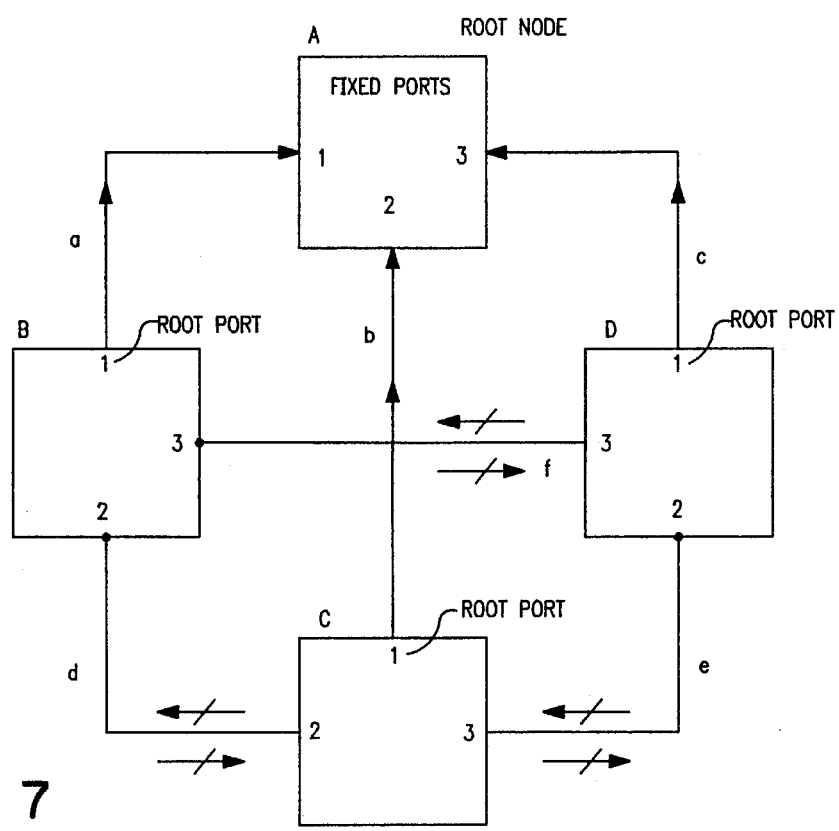
FIGS. 7 to 9 represent the assembly of FIG. 6, some of the links not in working order.

In the case of one or several failures of the links d, e, f (FIG. 7), the access to the root node A by the nodes B, C, and D is made, as before, by the links a, b, c respectively, the ports 1 of nodes B, C, D staying in root state.

Figure 2:
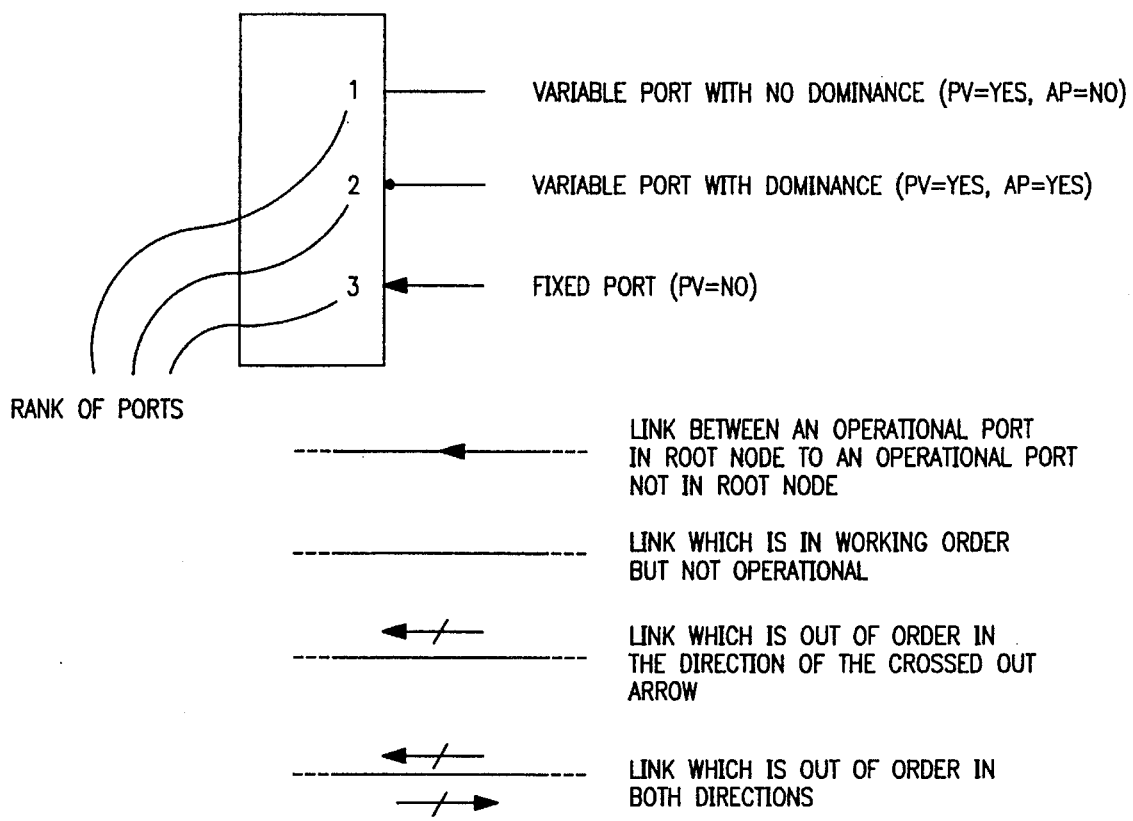
FIG. 2 is a symbolic representation of link attributes and link states as used in subsequent figures.
Figure 8:
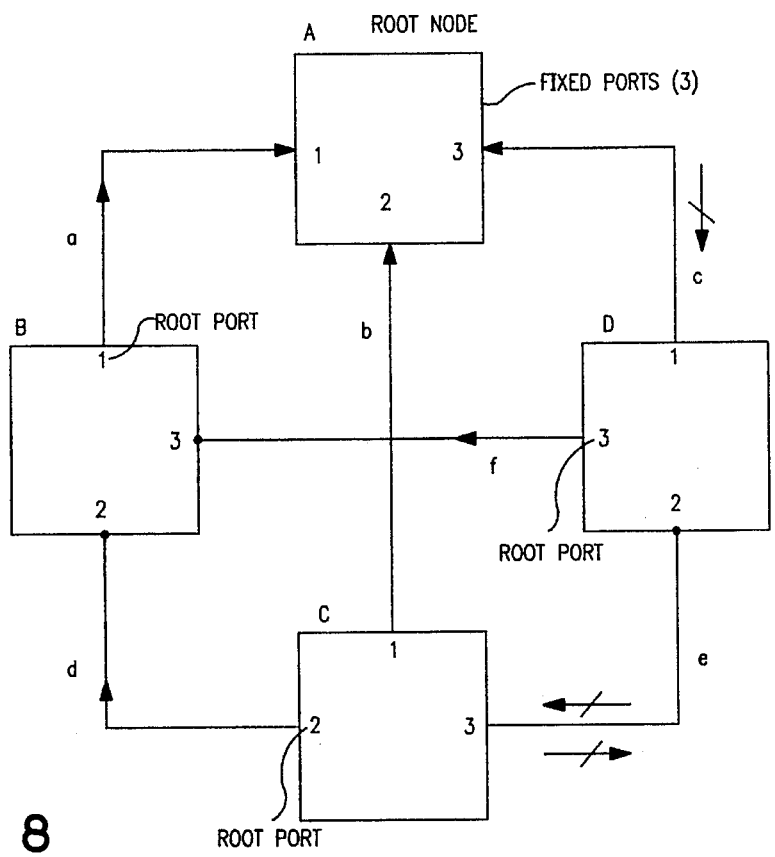

In FIG. 8 is represented the case of a failure or a rupture of the links b, c, e. Using the conventions of FIG. 2, the arrows point from the root ports in a direction toward the root node. The port 1 of the node B has stayed a port in root state. The port 2 of node C has become a port in root state. The same holds for the port 3 of the node D. The root node A is connected to the root port 1 of node B, which, in turn, is connected to the root port 2 of node C and to the root port 3 of node D.

Figure 9:
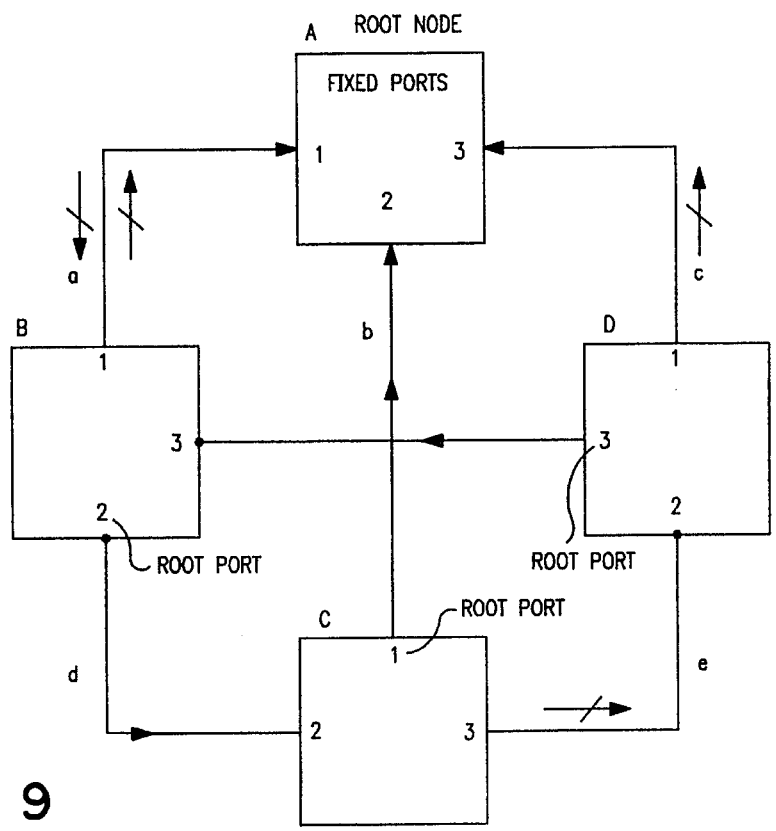

In the case of FIG. 9, the links a, c, and e are interrupted. The port 1 of the node C has stayed in root state. The port 2 of the node B has changed to root state. The root node A is connected to the root port 1 node C, the node C is connected to the root port 2 of node B by the link d and the node B is connected to the root port 3 of node D.

Although the invention has been described in detail above in connection with various preferred embodiments thereof, it will be appreciated by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A Communications network capable of withstanding a link or node failure comprising:

a root node having at least one fixed port;

at least two additional nodes with at least two variable ports, one of which ports is in a root state, said additional nodes being serially connected to each other by links which connect a variable port of one additional node to a variable port of an adjacent additional node, one of said connected variable ports having dominance over the other of said connected variable ports, said additional nodes having an additional port connected to one of said root node fixed ports;

said additional nodes including a port control circuit comprising:

means for sending to an adjacent node a configuration request to establish a root state on a variable port not in a root state in response to a failure of a link connected to another port which is in the root state;

means for determining whether said adjacent node has issued an authorization message to said requesting node; and means for configuring said variable port into a root state when said authorization message is received, whereby said variable port is configured into said root state when a failure exists along a link connected to said another port of said node which was previously in the root state, permitting communications through said newly configured port to said root node.

2. The communications network of claim 1 wherein said adjacent node transmits an authorization to said requesting node only if said adjacent node verifies that a link connecting said nodes is in working order.

3. Communication assembly according to claim 2, wherein the lack of an authorization to be in a root state is transmitted as a request to be in the root state.

4. A communication network including at least one node having multiple ports which have a rank with respect to each other, one of the ports being in a root state, and at least one remaining lower ranking port being variable and capable of being in the root state, said node including logic circuitry for placing said remaining port in the root state comprising:

means for detecting when a link connected to said port in a root state is disabled;

means for issuing a request to be in the root state on said remaining port connected by a second link to a variable port of another node;

means for detecting an authorization to be in the root state on said second link from said another node; and means for enabling said remaining variable port to be in the root state when said authorization is received.

5. The communications network of claim 4 wherein said logic circuitry includes an input R(P) from a port of a higher rank which identifies if a port of a higher rank is in the root state, and inhibits said variable port from entering a root state.

6. The communications network 4 wherein different nodes are connected by a link to respective ports so that one connected port of one node is dominant over the other connected port of the other node.

7. The communications network of claim 4 wherein said authorization comprises detecting a particular signal condition on a sublink of said second link.

8. The communications network of claim 4, wherein logic circuitry includes:

means for detecting a request to be in a root state from a node connected to said second link; and means for inhibiting initiating said request to be in the root state by said variable port of said one node if said request to be in the root state is received by said means for detecting a request to be in the root state from said node connected to said second link.

9. A communications assembly having nodes and duplex links, each duplex link linking a port of a node to a port of another node, said communication assembly being such that at each time, depending on which link or nodes are in working order, one or several operational networks are established, each of said operational networks having a root node and a number of non-root nodes with links linking all the nodes in an rooted tree configuration, where each non-root node has one root port connected to a link in the direction of the root node, and one or more operational non-root ports are connected to a link terminated in a non-root node having a port in the root state, said node comprising:

means for specifying for each port whether it is a fixed port which can never be in the root state, or a dominate variable port which may become the port in the root state of its node, if the link connected to it is in working order and if no other port of the node is in the root state, or a non-dominate variable port, which may become in the root state for its node if the link connected to it is in working order, if no other port is in the root state of the node, and if it does not receive a request to be in the root state signal from a connected end of the link;

means for transmitting on dominate variable ports over links to which they are connected, a request to be in the root state;

means for receiving requests to be in a root state on non-dominate variable ports from a connected link; and p1 means for disconnecting a port of an operational network if it is not in working order, or if it is a non-dominate variable port over which a request to be in the root state is not received.

10. A communications assembly according to claim 9, further including means for placing a port in the root state for its node only if it receives an authorization to be in root state signal from the other end of the link, which is sent by another port of another node only if said link is in working order.

11. A communications assembly according to claim 9, wherein the variable ports have a predefined rank, and each includes means for transmitting a request to be in the root state on each variable port, and node includes means for selecting a variable port having the lowest rank which receives an authorization to be in the root state from a connected link.

* * * * *